Figure 1:
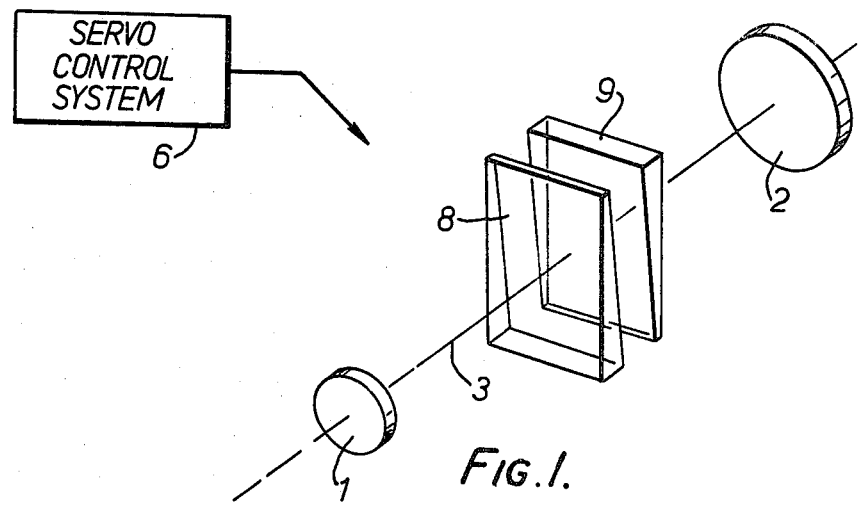

United States Patent [19]

Garner

[11] 4,364,628
[45] Dec. 21, 1982

[54] OPTICAL SIGHTS

[75] Inventor: Frederick Garner, Thurcaston, England

[73] Assignee: The Marconi Company Limited, Chelmsford, England

[21] Appl. No.: 184,332

[22] Filed: Sep. 5, 1980

[30] Foreign Application Priority Data

Sep. 5, 1979 [GB] United Kingdom ............... 7930786

[51] Int. Cl.³ .............................................. G02B 23/02
[52] U.S. Cl. ............................. 350/500; 89/41 E; 350/484; 356/247
[58] Field of Search ............ 350/16, 30, 48, 484; 356/247, 253; 89/41 E

[56] References Cited

U.S. PATENT DOCUMENTS 2,966,063  12/1960  Schaefer et al.
3,297,395   1/1967  Dardarian.
3,378,687   4/1968  Schepler.
3,514,619   5/1970  Ireland.
3,884,548   5/1975  Linder.
4,118,109  10/1978  Crawford et al.
4,155,621   5/1979  Mead ................................. 350/16
4,210,385   7/1980  Baudot ............................. 350/16
4,260,218   4/1981  Gullicksen et al. .............. 350/16

FOREIGN PATENT DOCUMENTS 774437   5/1957  United Kingdom ............... 350/16
905847   9/1962  United Kingdom.
1148951  4/1969  United Kingdom.
1319307  6/1973  United Kingdom.
1374765 11/1974  United Kingdom.
1474709  5/1977  United Kingdom.

Primary Examiner—John K. Corbin
Assistant Examiner—Matthew W. Koren
Attorney, Agent, or Firm—Spencer & Kaye

[57] ABSTRACT

The invention provides a stabilizable optical gun sight including an optical system having an eye piece and an objective lens and between the eyepiece and objective lens, two optical wedges which are arranged to be driven differentially and together in order to deflect the line of sight through the optical system in response to servo control signals applied to the driving means.

5 Claims, 4 Drawing Figures

OPTICAL SIGHTS

This invention relates to optical sights and in particular to optical sights which are required to be stabilised.

Whilst the invention is applicable generally to optical sights which are required to be stabilised, such as may be used for cameras in some cases, the principal concern of the present invention is optical gun sights for use with the gun control system of fighting tanks.

The present invention seeks to provide improved optical sights and in particular improved stabilisable gun sights for fighting tanks.

According to this invention an optical sight comprises an optical system including an eye piece and an objective lens and between said eye piece and said objective lens two serially arranged optical wedges mounted so as to be rotatable both relatively one with respect to the other and together about said optical axis whereby the line of sight through said optical system may be moved.

Preferably said optical sight is a stabilisable optical sight and means are provided for applying servo control signals to driving means for said optical wedges whereby in operation said sight tends to be stabilised against movements of a body on which said sight is carried.

Preferably said two wedges are mounted on parts which are arranged freely to be rotatable within a casing each part carrying a bevel gear with the two bevel gears arranged to be driven differentially by a bevel pinion driven by a first servo motor assembly.

Preferably said first servo motor assembly is itself mounted upon a further part which is arranged freely to be rotatable within said housing which further part is driven by a further servo motor assembly mounted on said casing whereby operation of said further servo motor assembly causes said further part and said first servo motor assembly and said differential pinion gear to be rotated together thus causing said two optical wedges to be rotated together.

Preferably each servo motor assembly comprises a servo motor and a gear box drive and a positional transducer and for each servo motor assembly a servo amplifier control loop is provided comprising an input terminal for error control signals, a comparator connected to derive input from said input terminal and from the output of said positional transducer (usually via scaling means e.g. a potentiometer), and a servo amplifier connected to the output of said comparator via a signal processing circuit as required, the output of said amplifier being connected to drive said servo motor.

According to a feature of this invention a gun control system for a fighting tank, including a gun barrel stabilisation system comprising means for developing stabilisation error signals resulting from movement of said tank and means for utilising said stabilisation error signals to drive a gun barrel in elevation and a turret carrying said gun barrel in azimuth to provide stabilisation, includes a gun sight as described above arranged to provide compensation for stabilisation error remaining in said gun barrel stabilisation system.

Figure 2:
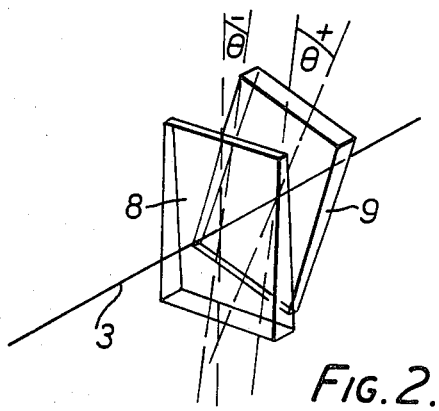
Figure 3:
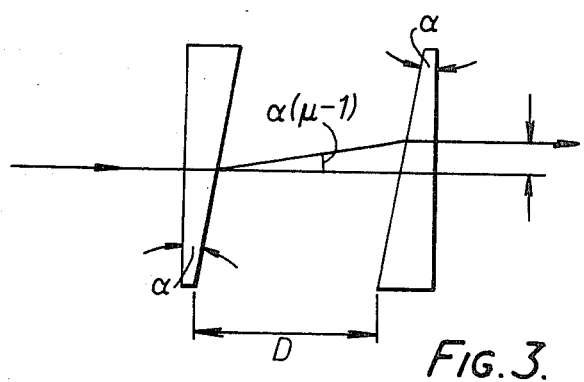
Figure 4:
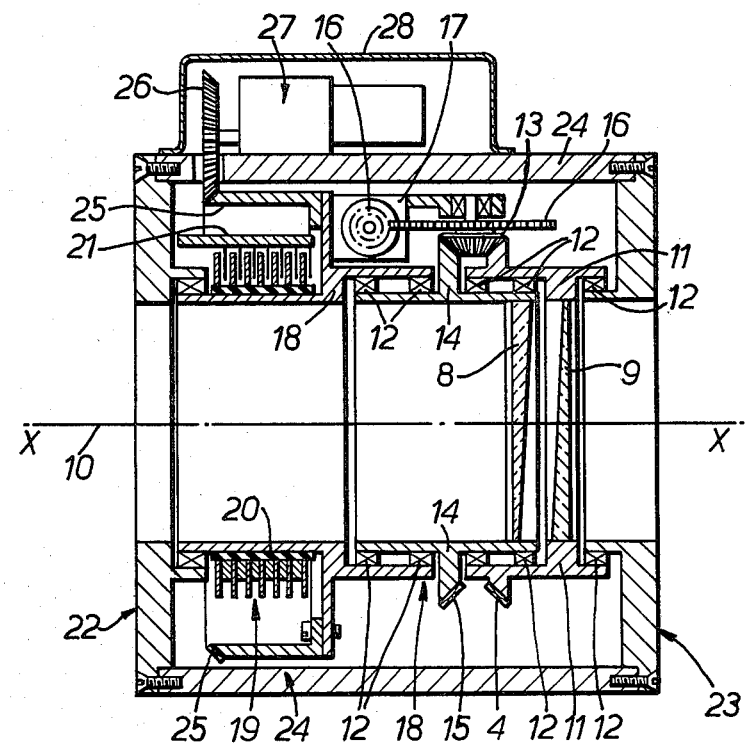

The invention is illustrated in and further described with reference to the accompanying drawings in which:

FIGS. 1 to 3 schematically illustrate essential features of a stabilised gun sight in accordance with the present invention and, FIG. 4 is a section through one practical example of a stabilisable gun sight in accordance with the present invention.

Referring to FIG. 1 the sight consists of an eye piece and an objective lens 2 forming an optical system through which the tank gunner looks along a line of sight 3.

Positioned between the eye piece 1 and the objective lens 2 is a series combination of two optical glass wedges 8 and 9. It will be seen that one is inverted relative to the other. The wedges 8 and 9 are rotatable about the optical axis 3 both one relative to the other and together. Controlling the relative rotation of one wedge with respect to the other and the absolute rotation of the combination of the two wedges will enable the line of sight 3 to be moved in any co-ordinate direction as best seen from FIGS. 2 and 3.

In FIG. 1 the wedges 8 and 9 are shown orientated with their vertical axis in alignment. FIG. 2 shows the two wedges 8 and 9 after rotation through angles of $+\Theta$ and $-\Theta$ respectively. The movement of the scene to the gunner's eye depends upon the geometry of the wedges 8 and 9 (referring to FIG. 3 the angle $\alpha$ of the wedges and the spacing D) and also upon the angles $+\Theta$ and $-\Theta$ through which the wedges 8 and 9 have been turned.

The movements of the wedges 8 and 9 are controlled by a servo control system 6 which derives error signals in X and Y co-ordinates which represent the deviation required of the line of sight 3 in order to stabilise the system and take into account gun pointing error arising from movement of the tank. Control signals are applied to driving servos (not shown in FIG. 1) of the wedges 8 and 9 in order to provide the required compensating rotation.

It is, of course, well known per se to derive such error signals and the majority of present day fighting tanks are equipped with stabilizing systems, based upon gyroscopes for example, and commonly such error signals are utilised to adjust the direction in which the gun barrel is pointing by means of servos adjusting the elevation of the gun barrel and the rotation of a turret carrying the said gun barrel. For the purposes of the present explanation it may be assumed that the gun sight schematically illustrated in FIG. 1 is utilised in such a tank in which a basic stabilisation system is employed utilising servos to control elevation of the gun barrel and the rotation of the turret. Thus in this case the stabilisation provided within the gun sight itself is not required to achieve total stabilisation but merely to take into account any remaining stabilisation error in the system.

The assembly comprising the wedges 8 and 9 and any driving servos therefor is mounted as a unit such that under control of the gunner the unit may be swung out of the optical path of the system so as to afford the gunner with a "genuine bore sight" view.

Referring to FIG. 4 this shows in section an instrument assembly containing the two wedges 8 and 9 which is interposed between the eye piece 1 and the objective lens 2 of the gun sight represented in FIG. 1 in the position occupied in that figure. The optical axis of the assembly is represented at 10. Wedge 9 is mounted upon a part 11 which is freely rotatable about the optical axis 10 on bearings 12. The part 11 housing wedge 9 is formed with a flange on which is cut a bevel gear 14 which engages with a bevel pinion 13.

Wedge 8 is mounted upon another part 14 which is also arranged to be freely rotatable about the axis 10 by means of bearings 12. Part 14 is also formed with a flange upon which a bevel gear 15 is cut.

Bevel gear 15 is also in mesh with bevel pinion 13 so that when bevel pinion 13 is rotated bevel gears 14 and 15 are driven differentially.

Bevel pinion 13 is driven by a worm and wheel gear assembly 16 by means of a motor/gear box assembly 17.

Whilst not separately represented, the motor/gear box assembly 17 also includes a positional transducer in the form of a digital encoder or an AC resolver or a conducting plastics potentiometer.

As will now be appreciated, as bevel gear 13 is turned via the gear assembly 16 by motor/gear box 17 a differential movement is imparted to the two optical wedges 8 and 9 with respect to a third, freely rotatable, part 18 which houses the motor/gearbox 17. Third part 18 carries a slip ring assembly 19 consisting of polished coin silver slip rings spaced by paxolin shims and insulated from part 18 by a paxolin tube 20. A brush holder 21 carries precious metal wire brushes which contact the slip rings of slip ring assembly 20. Flying leads to the brushes of brush gear holder 21 are taken via a suitable grommet in one end cover 22 of the assembly. The slip rings and brush gear assembly 19 and 21 permits supplies and positional feedback signals to be routed to and from the differential wedge-driver motor/gearbox assembly 17. The whole assembly so far described is encased by the aforementioned end cover 22, an opposite end cover 23 and an outer cylindrical main frame 24.

In order to provide for absolute rotation of the optical glass wedges 8 and 9 together, the freely rotatable part 18 is itself provided with a gear 25 which is meshed with a driving bevel gear 26 extending through a suitable aperture in the main frame 24. Bevel gear 26 is itself driven by a second motor/gearbox/positional transducer assembly 27 fixedly mounted to the outside of main frame 24 and housed under a protective cover 28.

Thus by applying suitable servo control signals to motor assembly 27 the wedges 8 and 9 can be rotated together about the axis 10 whilst the relative rotation of the wedges 8 and 9 may be determined by servo control signals applied to the motor assembly 17. As will be appreciated, referring again to FIG. 3, defining the required shift of the line of sight in R$\ominus$ terms the relative rotation of the wedges 8 and 9 will determine R and the absolute rotation of the wedges 8 and 9 together will determine $\ominus$.

I claim:

1. A stabilisable optical sight suitable for use with a fighting tank gun control system which has gun barrel stabilisation apparatus including means for developing stabilisation error signals resulting from movement of the tank, and means for utilising the thus developed stabilisation error signals to drive the tank's gun barrel in elevation and the tank's gun turret in azimuth to provide the required stabilisation, said sight comprising:

an optical system with an eye piece, an objective lens, and a pair of serially-arranged optical wedges disposed between said eye piece and said objective lens on the optical axis of said optical system, said pair of optical wedges being mounted on first and second mounting means so as respectively to be rotatable about said optical axis both relatively one wedge with respect to the other and together, whereby the line of sight through said optical system may be moved by rotation of one or both of said wedges;

driving means connected to said first and second mounting means for causing said optical wedges to be so rotated in operation;

and means for applying servo control signals to said driving means, whereby in operation the wedges may be so rotated in order to stabilise the sight against movement of a body on which it is carried.

2. A sight as claimed in claim 1 wherein: said first mounting means includes first and second parts, which are arranged freely to be rotatable within a casing, on which said two wedges are mounted, respectively, each said part carrying a bevel gear with the two bevel gears arranged to be driven differentially by a bevel pinion; and said drive means includes a first servo motor assembly for driving said bevel pinion.

3. A sight as claimed in claim 2 wherein: said second mounting means includes a further part which is arranged freely to be rotatable within said casing and on which said first servo motor assembly is itself mounted; and said drive means includes further a further servo motor assembly mounted on said casing and connected to said further part for driving same, whereby operation of said further servo motor assembly causes said further part, said first servo motor assembly and said differential pinion gear to be rotated together thus causing said two optical wedges to be rotated together.

4. A sight as claimed in claim 3 wherein each said servo motor assembly comprises a servo motor, a gear box drive and a positional transducer, and for each servo motor assembly a servo amplifier control loop is provided comprising an input terminal for error control signals, a comparator connected to derive input from said input terminal and from the output of said positional transducer, and a servo amplifier connected to the output of said comparator via a signal processing circuit as required, the output of said amplifier being connected to drive said servo motor.

5. In a gun control system for a fighting tank including a gun barrel stabilisation apparatus comprising means for developing stabilisation error signals resulting from movement of said tank, and means for utilising the thus developed said stabilisation error signals to drive the tank's gun barrel in elevation and the tank's turret carrying said gun barrel in azimuth to provide the required stabilisation; the improvement wherein said gun control system incorporates a stabilisable optical gun sight as claimed in claim 1 arranged to receive servo control signals from said gun barrel stabilisation apparatus; with said servo control signals being applied to said driving means so as to provide compensation for any stabilisation error remaining in said system.

* * * * *